(12) United States Patent
Moine et al.

(10) Patent No.: US 8,062,526 B2
(45) Date of Patent: Nov. 22, 2011

(54) SEPARATION OF PLATINUM GROUP METALS

(75) Inventors: Laurence Moine, Saint Cloud (FR); David Colin Sherrington, Glasgow (GB); Richard Alasdair Grant, Reading (GB)

(73) Assignee: Anglo Platinum Limited, Johannesburg (ZA)

( * ) Notice: Subject to any disclaimer, the term of this patent is extended or adjusted under 35 U.S.C. 154(b) by 975 days.

(21) Appl. No.: 12/017,662

(22) Filed: Jan. 22, 2008

(65) Prior Publication Data

US 2008/0128357 A1 Jun. 5, 2008

Related U.S. Application Data (62) Division of application No. 10/513,357, filed as application No. PCT/GB03/01548 on Apr. 11, 2003, now Pat. No. 7,354,517.

(30) Foreign Application Priority Data

May 2, 2002 (GB) .................................. 0210099.8

(51) Int. Cl.
*B01D 15/08* (2006.01)
(52) U.S. Cl. ..................... 210/635; 210/656; 210/198.2; 423/22
(58) Field of Classification Search ............. 423/22; 210/635, 638, 656, 198.2, 502.1
See application file for complete search history.

(56) References Cited

U.S. PATENT DOCUMENTS

| | | | |
|---|---|---|---|
| 4,105,442 A | 8/1978 | Fieberg et al. | |
| 4,130,625 A | 12/1978 | Evers et al. | |
| 4,885,143 A | 12/1989 | Schmuckler | |
| 5,120,443 A | 6/1992 | Bruening et al. | |
| 5,165,901 A | 11/1992 | Crozier et al. | |
| 5,478,376 A | 12/1995 | Grant et al. | |
| 6,365,049 B1 | 4/2002 | Smith | |

FOREIGN PATENT DOCUMENTS

| | | |
|---|---|---|
| DE | 197 46 134 C1 | 3/1999 |
| EP | 0 106 327 | 4/1984 |
| EP | 0 756 013 A1 | 1/1997 |
| EP | 0 906 962 A1 | 4/1999 |
| EP | 1 074 635 A1 | 2/2001 |
| EP | 1 167 555 A1 | 1/2002 |
| GB | 2 293 372 A | 3/1996 |
| WO | WO 99/14385 | 3/1999 |
| WO | WO 02/36837 A1 | 5/2002 |

OTHER PUBLICATIONS

Frank Bottomley, "Nitrosyl Complexes of Ruthenium," *Coordination Chemistry Reviews*, vol. 26, No. 1, Jun. 1978, pp. 7-32.

E. E. Mercer, W. M. Campbell, Jr., and R. M. Wallace, "Chloro Complexes of Nitrosylruthenium," *Inorganic Chemistry*, vol. 3, No. 7, 1964, pp. 1018-1024.

(Continued)

*Primary Examiner* — Ernest G Therkorn
(74) *Attorney, Agent, or Firm* — RatnerPrestia (57) ABSTRACT

A process for the chromatographic interseparation of rhodium in admixture with at least one base metal from a feed solution includes complexes of these metals. The process includes contacting the solution with at least one chromatographic medium, and eluting one or more fractions such that at least one fraction includes rhodium complex substantially free from base metal contamination. The at least one chromatography medium includes a support functionalized with substituted amine groups which further include at least one hydrophilic group. Other platinum group metals can also be separated, both from one another and from base metals.

14 Claims, 7 Drawing Sheets

OTHER PUBLICATIONS

Michael J. Hudson, Kevin D. Helps, and Alan Dyer, "Selective Extraction of Ruthenium-Nitrosyl Cations Using Modified Inorganic Materials," (Cambridge: Royal Society of Chemistry, 1993, Special Publication No. 122), pp. 289-297.

Ed. By Fathi Habashi: "Handbook of Extractive Metallurgy," 1997, Wiley-VCH, Weinheim, Germany, pp. 1288-1297 and 1321-1326.

Kukushkin et al., "Sorption of platinum metals by copolymers of glycidyl methacrylate and ethylene dimethacrylate modified with ethylenediamine and diethylamine," *Journal of Applied Chemistry of USSR*, vol. 52, No. 7(1), Jul. 1979, pp. 1414-1418.

International Search Report dated Aug. 12, 2003, from International Application No. PCT/GB03/01548.

British Search Report dated Oct. 14, 2002, from British Patent Application No. 0210099.8.

SEPARATION OF PLATINUM GROUP METALS

CROSS-REFERENCE TO RELATED APPLICATIONS

This application is a divisional application of U.S. patent application Ser. No. 10/513,357, filed May 23, 2005, which is the U.S. National Phase application of PCT International Application No. PCT/GB03/01548, filed Apr. 11, 2003, and claims priority of British Patent Application No. 0210099.8, filed May 2, 2002.

FIELD OF THE INVENTION

This invention concerns a process and a medium for the separation of metals in solution by chromatography, particularly for the separation of platinum group metals from one another and from base metals.

BACKGROUND OF THE INVENTION

Previously, it has been proposed to use gel chromatography to separate platinum group metals (PGM) from one another on an industrial scale. Prior proposals include U.S. Pat. No. 4,885,143 (Schmuckler). This patent describes a method in which the interseparation of platinum group metals (PGM) from an oxidised gold-free halide solution is achieved using a chromatographic medium such as a polysaccharide gel (Sephadex) or a polyacrylamide gel (Biogel). The PGM when dissolved in a chloride solution are absorbed onto the chromatographic column and are claimed to be selectively eluted in the order ruthenium, rhodium, palladium, platinum, iridium and caesium, although it is clear from the rest of the patent that Schmuckler meant osmium rather than caesium. The problem with this method is that there is in fact no clear separation of PGM.

This problem was to a large extent overcome by European patent application EP 756013 (Matthey Rustenburg Refiners Pty) which describes a method for the interseparation of PGM from a PGM-containing halide solution comprising the steps of passing the solution through a glycol methacrylate chromatographic medium, absorbing the PGM onto the medium, eluting each PGM using an acid solution to obtain each fraction containing at least one PGM. During the elution of a reduced, mixed rhodium, iridium, ruthenium, palladium, platinum and osmium/6 molar hydrochloric acid solution through Toyopearl HW-40C using a (usually 6 M) hydrochloric acid eluent, the first eluted band contains trivalent rhodium, iridium and ruthenium. It is clear that the method does not separate rhodium, iridium and ruthenium; either from each other or any combinations/permutations within. Rhodium, iridium and ruthenium are sometimes referred to as the insoluble metals. Furthermore, rhodium is conventionally difficult to chromatographically separate from a mixed solution with one or more base metals such as nickel and copper.

EP 1167555 A1 describes a process using continuous annular chromatography for the interseparation of base metals and platinum group metals. Two distinct media are required. The first comprises a cation exchange resin which is used to absorb the base metals, and the second is a size exclusion gel which is used to effect a separation of the PGM. The process is further complicated by the need for an inert layer to be present between the two media in order to prevent intercontamination. The purity of the PGM fractions obtained is also influenced by the concentration of the eluent and of the feed solution. Furthermore, the process does not separate ruthenium from rhodium.

SUMMARY OF THE INVENTION

The present invention sets out to address the problem of the separation of rhodium from base metals, from the other insoluble metals, ruthenium and iridium, and from other PGM using chromatography. This is of particular importance, allowing the separation of all of the platinum group metals, both from one another and from base metals, by chromatography. Presently, refining processes involve solvent extraction, distillation and ion exchange. The metals are processed sequentially, for example in the order osmium, gold, palladium, platinum, ruthenium, iridium and rhodium. The method of the present invention has several advantages over the previously described methods in allowing simultaneous separation of some or all of these metals using a single chromatographic medium. In addition, the process is extremely fast, and the purity and yield of the extracted metals is high.

Accordingly, the present invention is directed to a process for the chromatographic interseparation of platinum in admixture with rhodium and at least one base metal from a feed solution comprising complexes of these metals. The process comprises contacting the solution with at least one chromatographic medium and eluting one or more fractions such that at least one fraction comprises platinum complex substantially free from base metal contamination. The at least one chromatography medium comprises a support functionalised with substituted monoamine groups, wherein the monoamine groups comprise at least one hydrophilic group, and wherein platinum complex is eluted using a base.

DETAILED DESCRIPTION OF THE INVENTION

In accordance with the present invention, a process for the chromatographic interseparation of rhodium in admixture with at least one base metal from a feed solution comprising complexes of these metals comprises contacting the solution with at least one chromatographic medium, and eluting one or more fractions such that at least one fraction comprises rhodium complex substantially free from base metal contamination; wherein the at least one chromatography medium comprises a support functionalised with substituted amine groups; and wherein the amine groups further comprise at least one hydrophilic group.

Facile recovery of rhodium is thus possible. The base metals may themselves be chromatographically separated, the extent of such a separation being dependent on the medium used. Although the commercial value of separating base metals from one another is low in comparison to the value of recovering substantially pure rhodium, it may nevertheless be desirable in some applications. The base metals may comprise any metals commonly found in combination with PGM solutions for example, copper, nickel, arsenic, cobalt and iron.

Preferably, an eluent with a relatively low concentration of chloride ions is used as a first eluent in order to first elute the base metals, followed by a second eluent with a higher chloride ion concentration to elute rhodium. 1M hydrochloric acid is suitable as a first eluent, and hydrochloric acid of between 3M and 6M is suitable as a second eluent. Alternatives to hydrochloric acid include solutions of sodium chloride or lithium chloride.

The feed solution is suitably one which has an appreciable concentration of chloride ions, such that metals present can exist as chloro-complexes. As is common in the field of platinum group metal refining, a hydrochloric acid solution is preferred. The concentration of chloride ions in the feed solution may be 1M or less, but is preferably higher than 1M, for example between 1 and 6M, and most preferably, 6M. Alternatives to hydrochloric acid include solutions of sodium chloride or lithium chloride.

Preferably, the at least one hydrophilic group comprises a group chosen from alcohol, ether, carboxylic acid, ester, sulphone and amide, any of which may be branched or unbranched, substituted or unsubstituted.

Preferably, the at least one medium comprises the following structural formula;

wherein, $R^1$ is a single bond or a group chosen from alkyl, aryl, alkyl-aryl, alcohol, ether, carboxylic acid, ester, sulphone and amide, any of which may be branched or unbranched, substituted or unsubstituted; and wherein $R^2$ and $R^3$ may be the same or different, or together form a cyclic group, and are chosen from the group comprising hydrogen, alkyl, aryl, alkyl-aryl, alcohol, ether, carboxylic acid, ester, sulphone and amide, any of which may be branched or unbranched, substituted or unsubstituted, provided that at least one of $R^1$, $R^2$ and $R^3$ comprises a group chosen from alcohol, ether, carboxylic acid, ester, sulphone and amide.

In a particularly preferred embodiment of the present invention, the at least one medium comprises one or more of the following structural formulae;

where n is an integer between 1 and 30.

Preferably, the support comprises a polymer support.

Suitably, the polymer support comprises methacrylate moieties, styrene moieties, poly(ethylene glycol) moieties, acrylamide moieties or any combination or mixture thereof.

The polymer support may be pre-formed or may be synthesised during the formation of the medium, and may be cross-linked to a lesser or greater extent. Low levels of cross-linking, of the order of 1-10%, produce a gel-type product, whereas higher levels of cross-linking, e.g. of the order of 30-70% or even higher, used in combination with a suitable porogen (pore former) produce a rigid material. Porogens are known in the art and include species such as water and xylene. Such rigid materials do not exhibit gel-type swelling in aqueous media but, will readily sorb aqueous solutions into the permanent pore structure without significant volume swelling.

Particularly preferred is a co-polymer of ethylene glycol and methacrylic acid, for example a material from the Macro-Prep (trademark of Bio-Rad Laboratories) range of chromatographic media. This material has advantages in the scaling up of the chromatographic process because high pressure can be applied to a column containing the material to achieve high flow rates. Alternatively or in addition, the polymer support may be a co-polymer of oligoethyleneglycol, glycidylmethacrylate and pentaerythrol-dimethacrylate (for example a material from the Toyopearl (trademark of Toso-Haas and previously known as Fractogel) range of chromatographic media)

The polymer support may be functionalised by reaction with a substituted amine in a suitable solvent using standard laboratory procedures. Some non-limiting examples of substituted amines include diethanolamine, ethanolamine and morpholine. It is desirable that the functionalised support be washed prior to use to remove any unreacted amine. Other methods and synthetic routes will be known to the skilled man for example, the support may be reacted with an un-substituted amine which is then substituted via a further synthetic step.

The medium may be in any solid form, however preferably the medium is in the form of a gel or a porous solid. Beads, films and fibres are preferred. Beads may be of any particle size however preferably they have a mean particle size between 30 and 180 µm, more preferably between 40 and 100 µm.

Alternatively, the support may be an inorganic support such as silica, alumina or zirconia.

In one embodiment, the feed solution further comprises a complex of ruthenium, and the process further comprises the steps of ensuring that the ruthenium is present as a nitrosyl complex prior to, or whilst in contact with the medium and eluting at least one fraction comprising substantially pure ruthenium complex.

Ruthenium is unique amongst the platinum group metals in that it forms extremely stable nitrosyl complexes (containing the $NO^+$ moiety) and indeed has a well documented nitrosyl literature (Coord. Chem. rev (1978) 26 (1), 7-32, Mercer et al. Inorganic Chemistry, Vol. 3 No 7, 1964 pg. 1018). An extensive study has been previously performed by the present applicants looking at the potential use of ruthenium nitrosyl species in precious metal refining. Of relevance in the present context is that in 6 M HCl, there are two major ruthenium nitrosyl species present: $[Ru(NO)Cl_5]^{2-}$ and $[Ru(NO)Cl_4(H_2O)]^-$. In both complexes, the ruthenium is formally present in its divalent oxidation state. The $[Ru(NO)Cl_5]^{2-}$ and $[Ru(NO)Cl_4(H_2O)]^-$ species are in equilibrium, the equilibrium ratio at 6 M chloride concentration being approximately 2:1. As the chloride concentration decreases, the relative amount of the $[Ru(NO)Cl_4(H_2O)]^-$ species increases and as the chloride concentration increases, the relative amount of the $[Ru(NO)Cl_5]^{2-}$ species increases.

There are a number of literature methods (GB 2293372, Matthey Rustenburg Refiners PTY, Spec Pub. Royal Soc. Chem. (1993), 122) for preparing ruthenium nitrosyl species including the use of sodium nitrite, nitric oxide gas and nitric acid with a reductant. A presently preferred method for ensuring that ruthenium is present as a nitrosyl species is by treating the feed solution with a mixture of formic acid and nitric acid.

6M hydrochloric acid is suitable for use as an eluent to recover ruthenium. It is convenient that this eluent may be the same as that used to recover any rhodium present. Furthermore, it is a particular advantage of the present invention that ruthenium remains on the medium longer than rhodium such that their separation from one another, and also from base metals, is complete.

In a further embodiment, the feed solution further comprises a complex of iridium, and the process further comprises the steps of ensuring that the iridium is present in the tetravalent oxidation state whilst in contact with the medium, subsequently reducing the iridium to the trivalent oxidation state, and eluting at least one fraction comprising substantially pure iridium complex.

The feed solution may be treated to convert the iridium to the tetravalent oxidation state either prior to contacting the solution with the medium or alternatively, iridium may be oxidised whilst in contact with the medium. The oxidation of trivalent iridium to tetravalent iridium can be achieved using any suitable oxidising agent for example, hydrogen peroxide or chlorine.

Tetravalent iridium is strongly bound to the medium and as such needs to be reduced to the trivalent state in order for it to be eluted and recovered. Preferably, reduction of tetravalent iridium to trivalent iridium is effected using a mixture of hydrochloric acid and ascorbic acid, although other reducing species may be used. Once in the trivalent oxidation state, iridium can then be eluted. 6M hydrochloric acid is again suitable as an eluent. By delaying the reduction step until after elution of the base metals and any rhodium and ruthenium has been completed, the process of the invention allows the recovery of substantially pure iridium.

In a yet further embodiment, the feed solution further comprises a complex of platinum, and the process further comprises the steps of ensuring that the platinum is present in the tetravalent oxidation state whilst in contact with the medium, and eluting at least one fraction comprising substantially pure platinum complex.

The feed solution may be treated to ensure that the platinum is in the tetravalent oxidation state either prior to contacting the solution with the medium or alternatively, whilst in contact with the medium. The oxidation of divalent platinum to tetravalent platinum can be achieved using any suitable oxidising agent. Conveniently, the same oxidising agent used in relation to any iridium present can be used i.e., hydrogen peroxide or chlorine.

Tetravalent platinum is also strongly bound to the medium. Furthermore, it cannot easily be reduced to the divalent oxidation state and eluted using the steps suitable for the recovery of iridium. Preferably, platinum is removed by eluting with a base. A solution of an alkali metal or alkaline earth metal hydroxide, carbonate, or bicarbonate is suitable for example, a 1M solution of sodium hydroxide. Other basic solutions may also be used, although ammonia is not suitable due to it forming an insoluble salt with platinum, $(NH_4)_2[PtCl_6]$.

In a still further embodiment, the feed solution further comprises a complex of palladium, and the process further comprises the step of removing the palladium from the solution prior to contacting the solution with the medium.

Alternatively, the process further comprises the step of eluting at least one fraction comprising palladium complex.

Palladium can be eluted using 6M hydrochloric acid however, when present in admixture with a ruthenium nitrosyl species, both palladium and ruthenium are eluted together. This presents little practical difficulty as the separation of palladium and ruthenium from an essentially binary solution is facile and techniques for achieving this will be known to the skilled man. Of course, in the case of a feed solution which does not contain ruthenium complex, essentially pure palladium complex can be obtained without further processing and no prior removal of palladium from the feed is required. Methods for removing palladium from the feed solution will also be known to the skilled man and include for example, solvent extraction using dihexyl sulphide or oximes.

The use of a base as an eluent in platinum recovery forms a further aspect of the present invention and accordingly, a process for the chromatographic interseparation of platinum in admixture with at least one base metal from a feed solution comprising complexes of these metals comprises contacting the solution with at least one chromatographic medium, and eluting one or more fractions such that at least one fraction comprises platinum complex substantially free from base metal contamination; wherein the at least one chromatography medium comprises a support functionalised with substituted amine groups; wherein the amine groups further comprise at least one hydrophilic group; and wherein platinum complex is eluted using a base.

The process may be carried out using known chromatographic techniques. A suitable technique is batch chromatography whereby an aliquot of feed solution is loaded onto a column comprising a chromatography medium, and eluted. A valve arrangement is employed such that the output can be switched so that various species are collected in separate fractions. An alternative suitable method is continuous annular chromatography. These methods and others will be known to those skilled in the art.

The invention will now be described by way of example only and with reference to the following drawings, in which.

BRIEF DESCRIPTION OF THE DRAWINGS

DESCRIPTION OF THE PREFERRED EMBODIMENTS

Examples

Comparative Example

Figure 1:
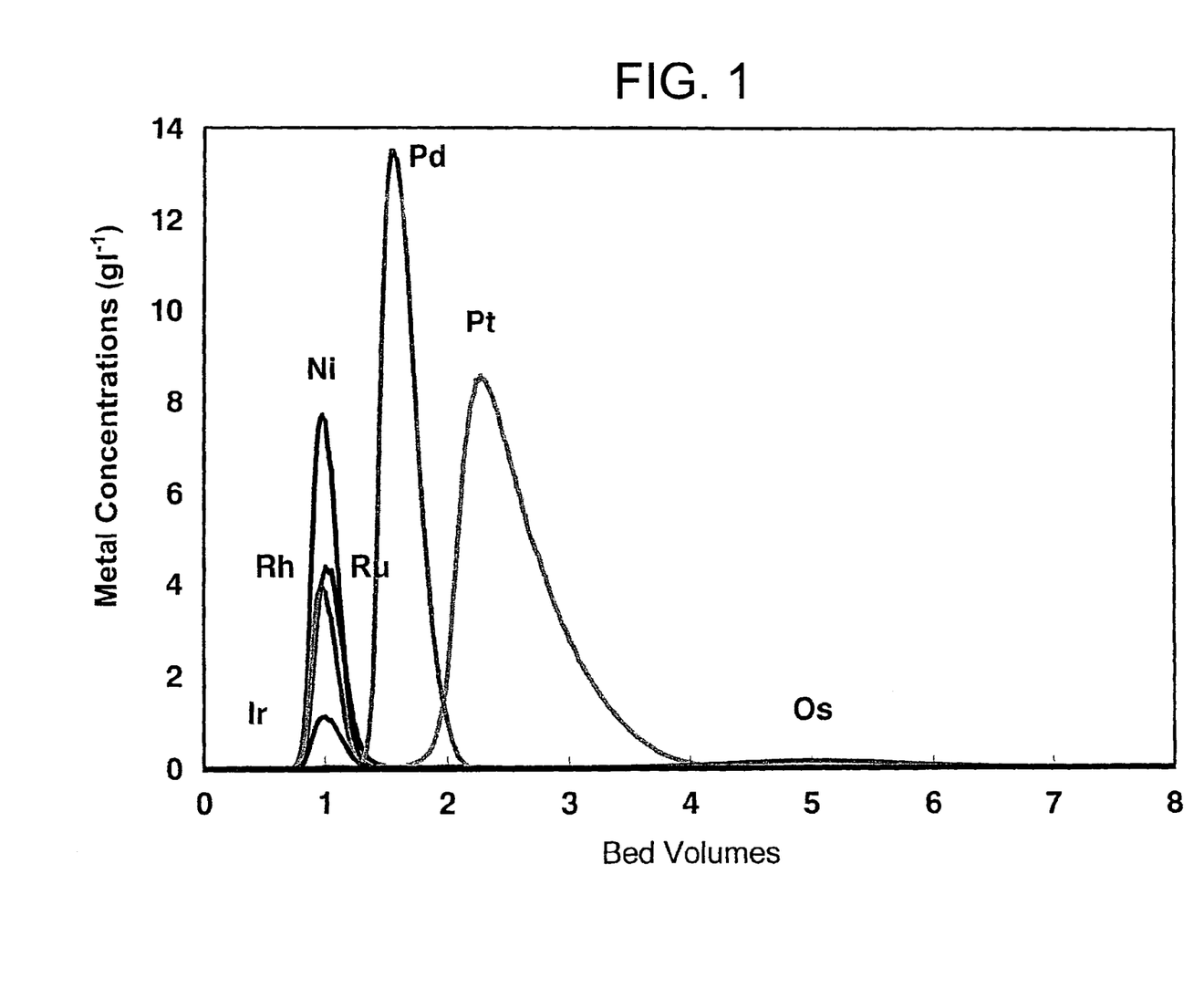
FIG. 1 is a chromatogram showing the separation of a mixed PGM and base metal solution using a commercially obtained medium.

A commercial medium, Toyopearl HW-40C, with a mean particle size of 64 μm, was used to pack a column of length 200 mm and diameter 5 mm. 0.25 ml of a sample solution containing 20 g/l Ru, 16 g/l Rh, 5 g/l Ir, 70 g/l Pd, 107 g/l Pt, 5 g/l Os and 30 g/l Ni in 6M hydrochloric acid was then added to the column and eluted using 6M hydrochloric acid at a flow rate of 0.375 ml/min. The results are shown in FIG. 1. It can be seen that although a separation of Pd, Pt and Os was achieved, the insoluble metals, Ru, Rh and Ir were eluted as a single peak. Furthermore, the insoluble metals are eluted along with Ni. This example confirms that this commercially available medium is not suitable for the interseparation of the insoluble metals, either from one another or from base metals.

Some examples of media suitable for use in the process of the present invention are shown in table 1 below.

Example 1

Synthesis of RG028

Medium RG028 was prepared by the derivatisation of MacroPrep epoxide obtained from BioRad Laboratories Ltd., Hemel Hempstead, UK. This is a macroporous bead material produced by the suspension polymerisation of glycidyl methacrylate and ethyleneglycol dimethacrylate (approx. ratio 40:60) containing 4 meq/g of epoxide groups. The manufactures quote a mean bead diameter of 50 μm and a mean pore size of 1000 Å.

TABLE 1

| Media code No. | Structure |
|---|---|
| RG004 | [support]-CH(OH)-CH$_2$-N(CH$_2$CH$_2$OH)$_2$ |
| RG006 | [support]-CH(OH)-CH$_2$-N(CH$_2$CH$_2$OCH$_3$)$_2$ |
| SC001 | [support]-CH(OH)-CH$_2$-NH(CH$_2$CH$_2$OH) |
| RG012 | [support]-CH(OH)-CH$_2$-NH-C(CH$_2$OH)$_3$ |
| RG018 | [support]-CH(OH)-CH$_2$-N(morpholino) |
| RG023 | [support]-CH(OH)-CH$_2$-N(CH$_3$)(CH$_2$CH$_2$OH) |
| RG020 | [support]-CH(OH)-CH$_2$-NH(CH$_2$CH$_2$OCH$_2$CH$_2$OH) |
| RG028 | [support]-C(=O)-O-CH$_2$-CH(OH)-CH$_2$-N(CH$_2$CH$_2$OH)$_2$ |
| RG010 | [support]-CH(OH)-CH$_2$-NH-(CH$_2$-CH$_2$-O)$_n$-CH$_2$-CH$_2$-NH-CH$_2$-CH(OH)-[support] |

MacroPrep epoxide (25 g) was placed in a round bottomed flask. To this was added diethanolamine (15.77 g=1.1× stoichiometric excess) dissolved in 1,4-dioxane (300 ml). The mixture was then heated to reflux with stirring. Sampling at regular intervals indicated that the reaction was substantially complete after seven hours. Once cooled the beads were filtered off and soxhletted for three hours to remove any unreacted amine. The beads were then washed with acetone (3×150 ml) and dried overnight in a vacuum oven. Analysis of the product gave 2.74 meq amine per g.

Example 2

Synthesis of RG018

Medium RG018 was prepared under identical conditions to RG028 but diethanolamine was substituted with morpholine (13.07 g). Analysis of the product gave 2.73 meq amine per g.

Example 3

Figure 2:
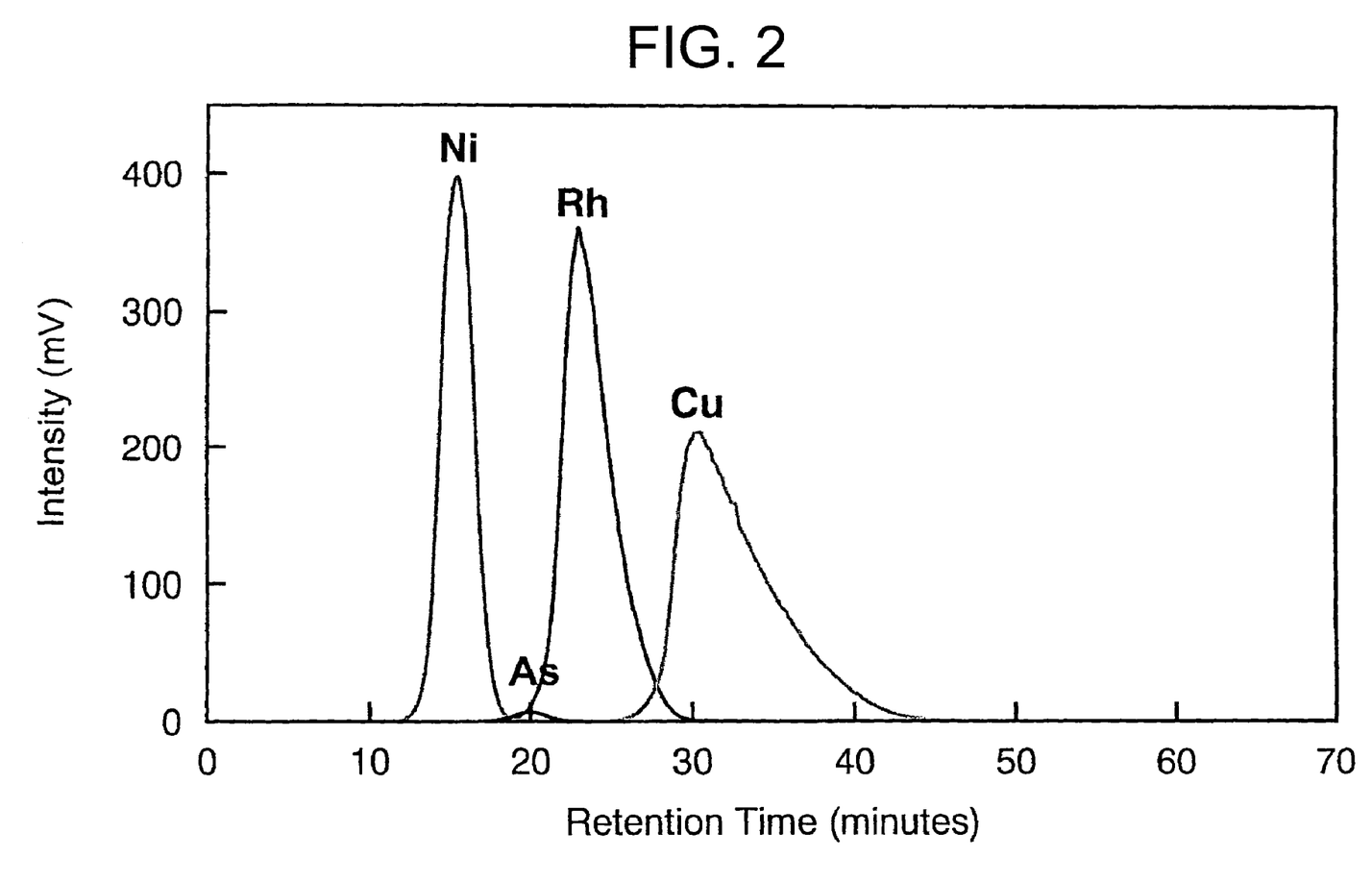
FIG. 2 is a chromatogram showing the separation of rhodium from a mixed solution containing base metals using an example of a process according to the present invention and an eluent comprising 6M hydrochloric acid.

Medium RG028, with a mean particle size of 50 μm, was used to pack a column of length 298 mm and diameter 10 mm. 1 ml of a sample solution containing 46 g/l Rh, 45 g/l Ni, 53 g/l Cu, and 1 g/l As in 6M hydrochloric acid was then added to the column and eluted using 6M hydrochloric acid at a flow rate of 1.44 ml/min. The results are shown in FIG. 2. Clear separation of Rh from both Ni and Cu is achieved, although the Rh peak is partially contaminated by As and occurs intermediate the base metal peaks.

Example 4

Figure 3:
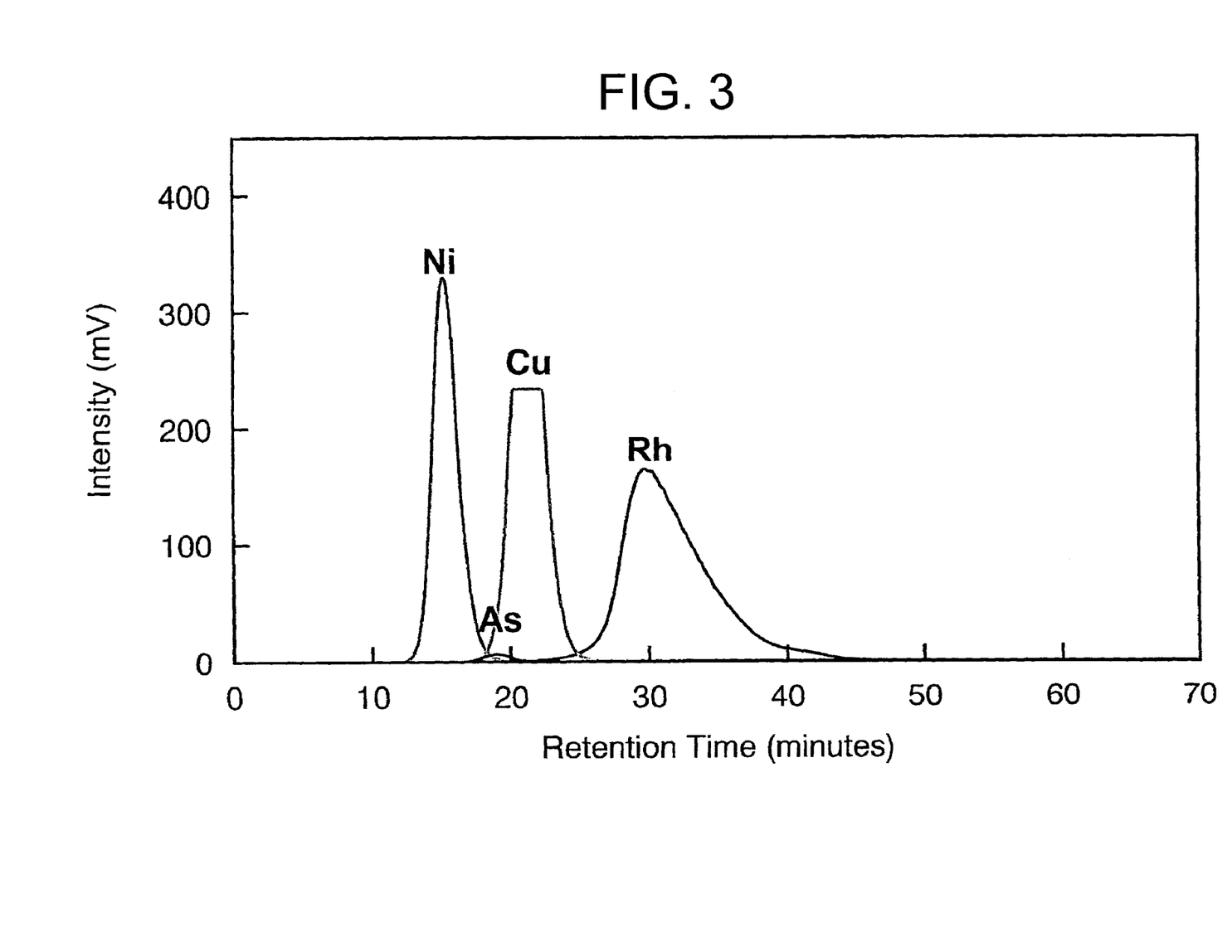
FIG. 3 is a chromatogram showing the separation of rhodium from a mixed solution containing base metals as in FIG. 2, but with an eluent comprising 4M hydrochloric acid.

Example 3 was repeated using an eluent of 4M hydrochloric acid. The results are shown in FIG. 3. Broadening of the Rh peak is observed however, clear separation of Rh from both Ni and Cu is maintained. Furthermore, the Rh peak now occurs after both of the base metal peaks. Contamination by As is removed.

Example 5

Figure 4:
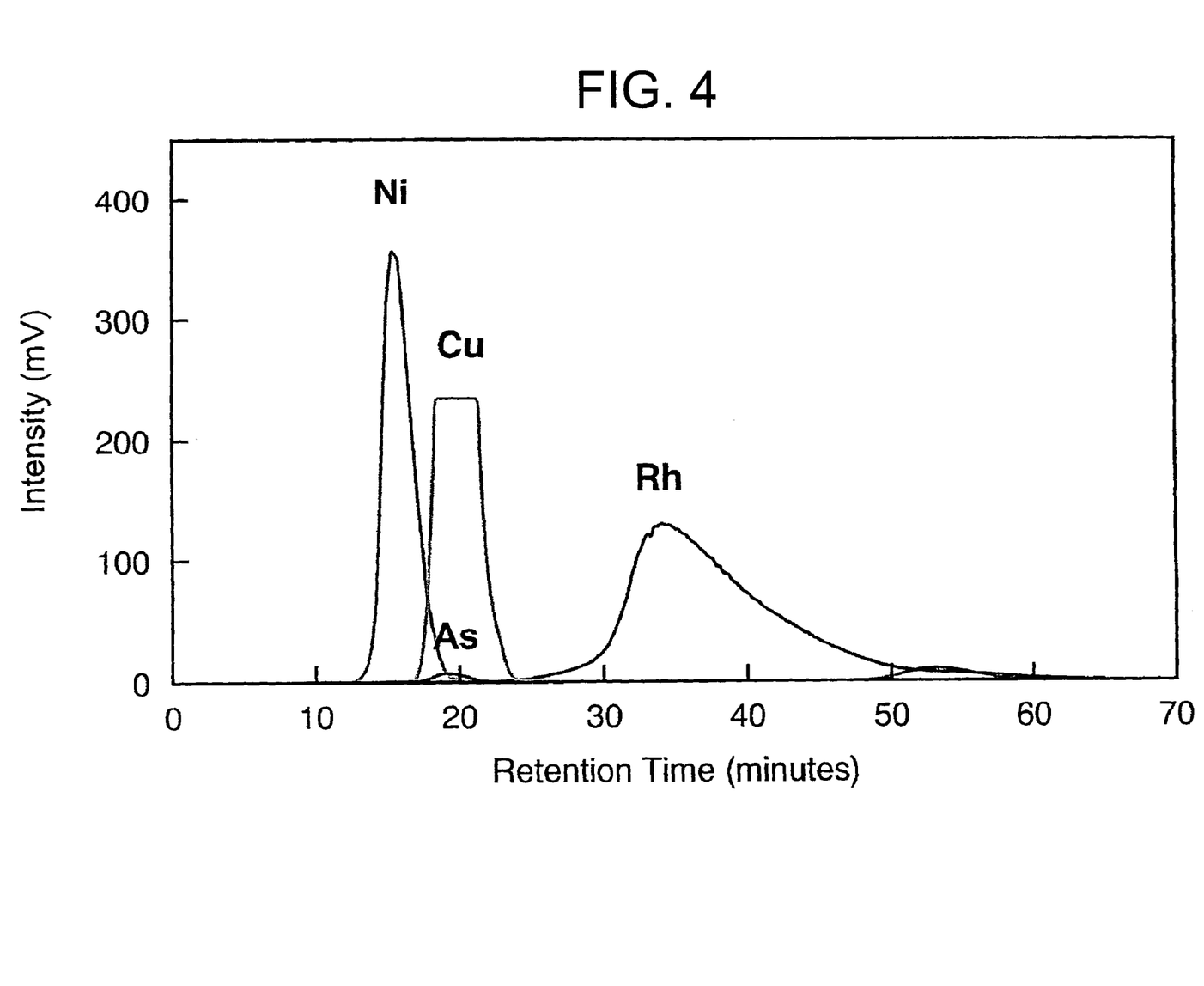
FIG. 4 is a chromatogram showing the separation of rhodium from a mixed solution containing base metals as in FIG. 2, but with an eluent comprising 3M hydrochloric acid.

Example 3 was repeated using an eluent of 3M hydrochloric acid. The results are shown in FIG. 4. Further broadening of the Rh peak is observed however, it is shifted further from the base metal peaks allowing more facile separation. Contamination by As is removed.

Example 6

Figure 5:
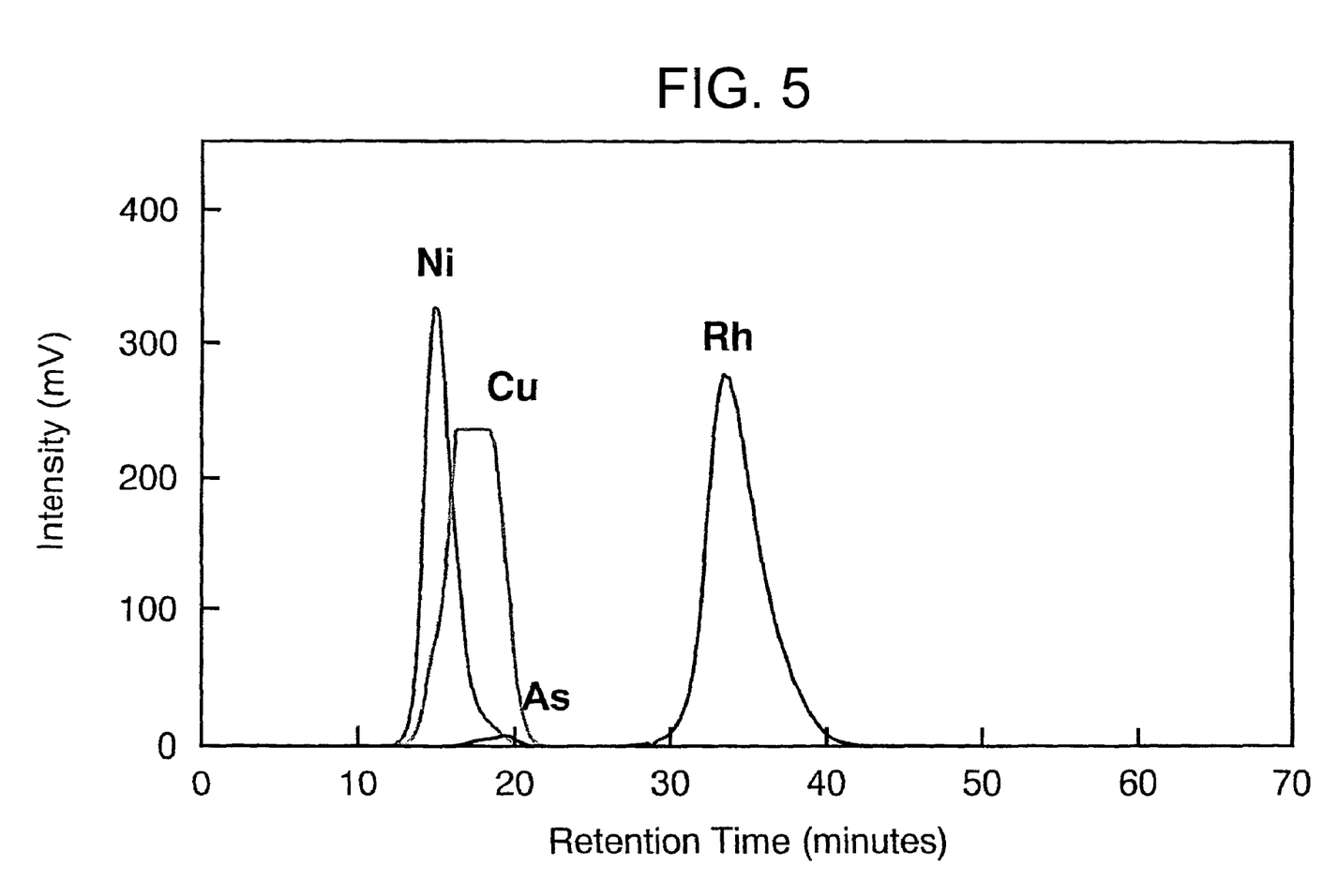
FIG. 5 is a chromatogram showing the separation of rhodium from a mixed solution containing base metals as in FIG. 2, but with a first eluent comprising 1M hydrochloric acid, followed by a second eluent comprising 6M hydrochloric acid.

Example 3 was repeated using a first eluent of 1M hydrochloric acid for 10 minutes, followed by a second eluent of 6M hydrochloric acid. The results are shown in FIG. 5. Sharpening of the Rh peak is observed, whilst clear separation of Rh from both Ni and Cu is maintained. Contamination by As is removed.

Example 7

Preparation of Feed Solution

A PGM refinery liquor (238 ml) containing 20 g/l Rh, 24.4 g/l Ru, 5.8 g/l Ir, 152.6 g/l Pt, $0.8 \times 10^{-3}$ g/l Pd, 55.5 g/l Ni, 17.3 g/l Cu and 0.7 g/l As in hydrochloric acid (2.98M) was evaporated to 100 ml and then back diluted with water to decrease the acidity to 1.44M. Conversion of ruthenium to ruthenium nitrosyl complex was achieved as follows. Formic acid (8 ml) was added at ambient temperature and the solution heated to reflux. Nitric acid (6 ml) was then added over a period of one hour and reflux continued for a further one and a half hours. The solution was allowed to cool to ca. 40° C. before the addition of concentrated hydrochloric acid (240 ml). The solution was then refluxed for two hours before being boiled back down to 240 ml.

A portion of the solution obtained above (200 ml) was then treated as follows to oxidise trivalent iridium to tetravalent iridium. Hydrogen peroxide (22 ml, 100 vols.) was added over a period of 24 hours whilst maintaining a gentle reflux.

After cooling, the solution was adjusted to give the final feed solution with a hydrochloric acid concentration of 5.14M Example 8

Figure 6:
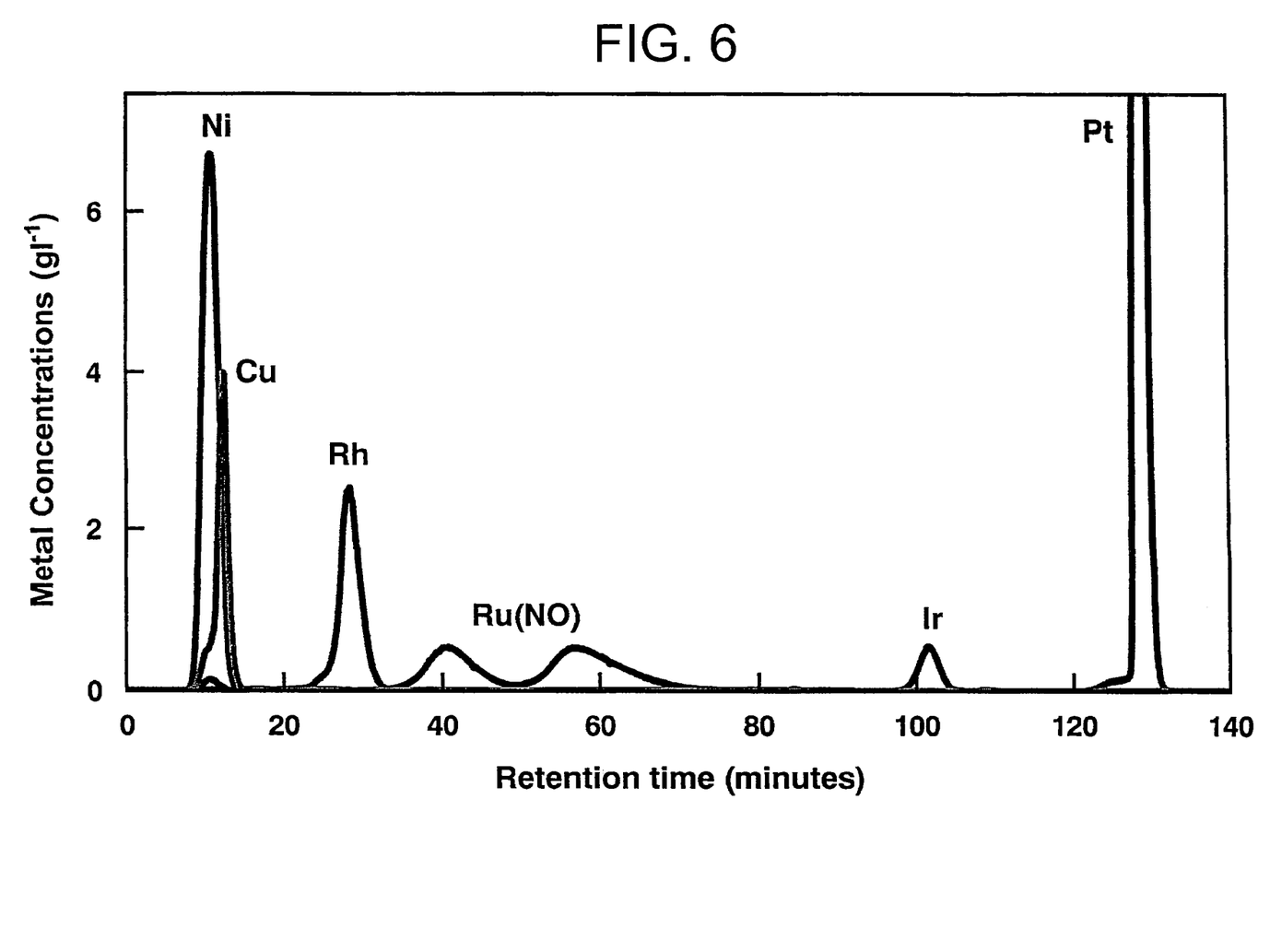
FIG. 6 is a chromatogram showing an example of the separation of rhodium, ruthenium, iridium and platinum from one another and from the base metals copper and nickel in a mixed solution; and, FIG. 7 is a chromatogram showing a further example of the separation of rhodium, ruthenium, iridium and platinum from one another and from the base metals copper and nickel in a mixed solution.

A column of length 250 mm and diameter 5 mm was packed with medium RG028 to a bed depth of 202 mm. The bottom of the column was then connected to the nebuliser of an ICP-OES spectrophotometer. 1M HCl was pumped through the column and the flow rate adjusted to 0.375 ml/min. A sample of the feed solution as prepared in Example 7 was injected and elution with 1M HCl continued. Results are shown in FIG. 6. After about 10 minutes, the base metals Cu and Ni were eluted off the column. The eluent was then changed to 6M HCl and elution continued for a further 77 minutes. Rh was eluted off the column first followed by Ru. The two peaks for Ru correspond to the two ruthenium nitrosyl complexes. Tetravalent iridium was then reduced to trivalent iridium on the column by introducing 1% w/v ascorbic acid in 1M HCl for 5 minutes. Trivalent iridium was then eluted off the column using 6M HCl for 12 minutes. Finally, tetravalent platinum was eluted off the column using an eluent of 1M sodium hydroxide solution. The column was then flushed with 1M hydrochloric acid in preparation for the introduction of a further sample.

Example 9

Figure 7:
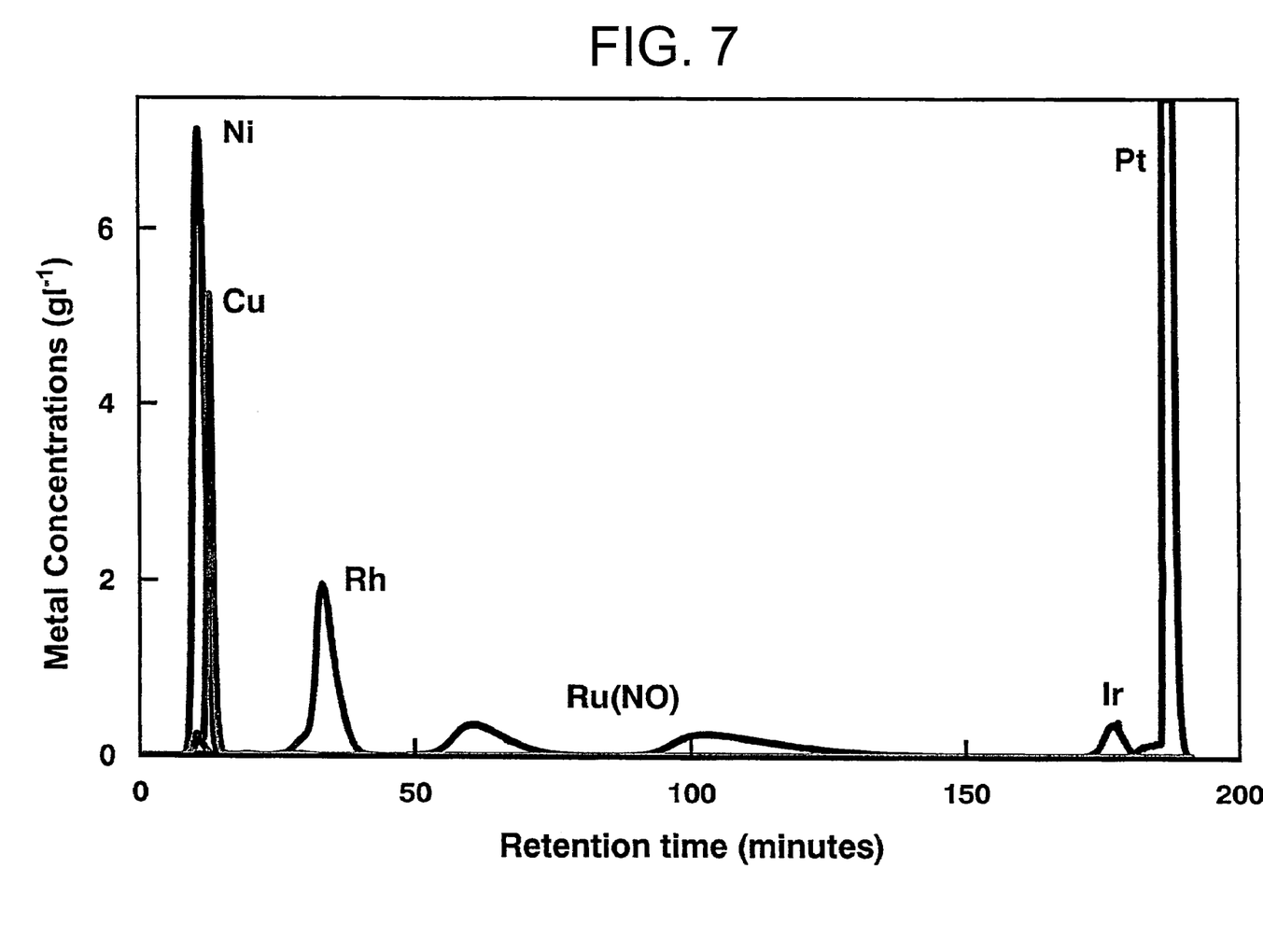

A column of length 250 mm and diameter 5 mm was packed with medium RG018 to a bed depth of 208 mm. Example 8 was repeated however, stronger retention of the complexes by the medium necessitated longer elution periods. These were as follows;

| Eluent | Duration |
| --- | --- |
| 1M HCl | 0-10 minutes |
| 6M HCl | 10-160 minutes |
| 1% ascorbic acid in 1M HCl | 160-165 minutes |
| 6M HCl | 165-180 minutes |
| 1M sodium hydroxide | 180-200 minutes |

Results are shown in FIG. 7.

What is claimed:

1. A process for the chromatographic interseparation of platinum in admixture with rhodium and at least one base metal from a feed solution comprising complexes of these metals, the process comprising contacting the solution with at least one chromatographic medium; and eluting one or more fractions such that at least one fraction comprises platinum complex substantially free from base metal contamination, wherein the at least one chromatography medium comprises a support functionalised with substituted monoamine groups, wherein the monoamine groups comprise at least one hydrophilic group, and wherein platinum complex is eluted using a base.

2. A process according to claim 1, wherein the base comprises an alkali metal or alkaline earth metal hydroxide, and a carbonate or bicarbonate.

3. A process according to claim 2, wherein the base comprises a 1M solution of sodium hydroxide.

4. A process according to claim 1, wherein the base comprises a basic solution other than an ammonia solution.

5. A process according to claim 1, wherein the at least one hydrophilic group is selected from the group consisting of alcohol, ether, carboxylic acid, ester, sulphone and amide, and of which may be branched or unbranched, substituted or unsubstituted.

6. A process according to claim 1, wherein the at least one medium further comprises the following structural formula;

wherein, $R^1$ is a single bond or is selected from the group consisting of alkyl, aryl, alkyl-aryl, alcohol, ether, carboxylic acid, ester, sulphone and amide, any of which may be branched or unbranched, substituted or unsubstituted; and wherein $R^2$ and $R^3$ may be the same or different, or together form a cyclic group, and are selected from the group consisting of hydrogen, alkyl, aryl, alkyl-aryl, alcohol, ether, carboxylic acid, ester, sulphone and amide, any of which may be branched or unbranched, substituted or unsubstituted, provided that at least one of $R^1$, $R^2$ and $R^3$ is selected from the group consisting of alcohol, ether, carboxylic acid, ester, sulphone and amide.

7. A process according to claim 1, wherein the support comprises a polymer selected from the group consisting of methacrylate moieties, styrene moieties, poly(ethylene glycol) moieties, acrylamide moieties and any combination or mixture thereof.

8. A process according to any of claim 1, wherein the support comprises an inorganic support selected from the group consisting of silica, alumina and zirconia.

9. A process according to claim 1, wherein the at least one medium is in the form of a gel, porous solid or fibre.

10. A process according to claim 1, wherein the feed solution further comprises a complex of iridium, and wherein the process further comprises the steps of ensuring that the iridium is present in a tetravalent oxidation state while in contact with the medium; subsequently reducing the iridium to a trivalent oxidation state; and eluting at least one fraction comprising substantially pure iridium complex.

11. A process according to claim 1, wherein the process further comprises the step of ensuring that the platinum is present in a tetravalent oxidation state while in contact with the medium.

12. A process according to claim 1, wherein the feed solution further comprises a complex of palladium, and wherein the process further comprises the step of removing the palladium from the solution prior to contacting the solution with the medium.

13. A process according to any of claim 1, wherein the feed solution further comprises a complex of palladium, and wherein the process further comprises the step of eluting at least one fraction comprising palladium complex.

14. A process according to claim 1, wherein the feed solution further comprises a complex of ruthenium, and wherein the process further comprises the steps of ensuring that the ruthenium is present as a nitrosyl complex prior to, or whilst in contact with the medium and eluting at least one fraction comprising substantially pure ruthenium complex.

* * * * *